June 30, 1931.  L. R. HUFF  1,811,850
CENTRIFUGAL HYDRAULIC SPEED GOVERNOR
Filed Nov. 10, 1930
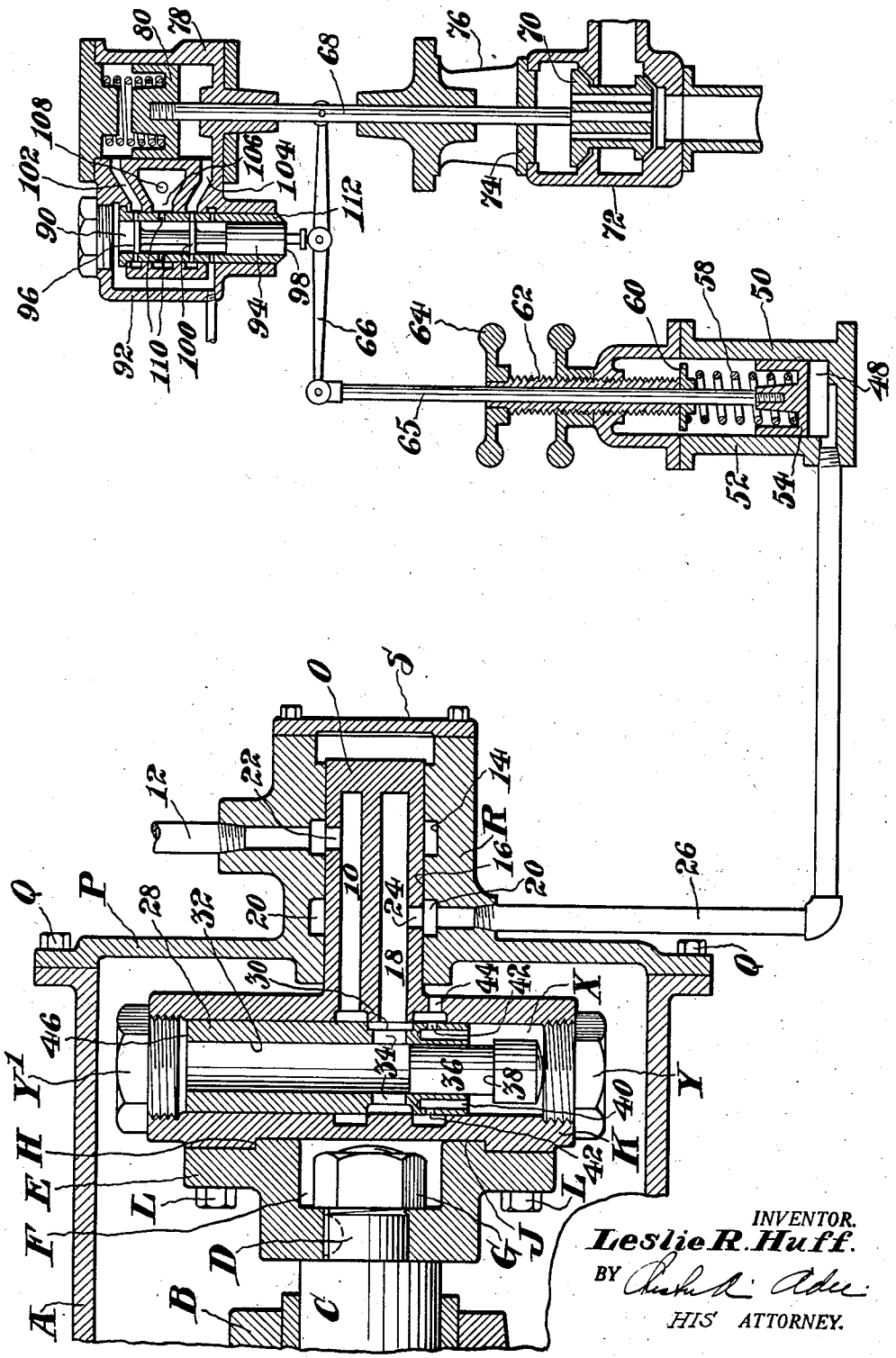
INVENTOR.
Leslie R. Huff.
BY
HIS ATTORNEY.

Patented June 30, 1931

1,811,850

UNITED STATES PATENT OFFICE

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY

CENTRIFUGAL HYDRAULIC SPEED GOVERNOR

Application filed November 10, 1930. Serial No. 494,611.

This invention relates to speed governors, but more particularly to a hydraulic speed governor adapted to be interposed between a source of liquid pressure, as for instance oil under pressure, and an element intended to be governed.

One object of the invention is to assure a minimum amount of variance in the speed of the element intended to be governed.

Another object is to render the device delicately responsive to any variation in the operating speed of a prime mover.

Other objects will be in part obvious and in part pointed out hereinafter, and to all of these ends the invention consists of the combination of elements and arrangement of parts as shown in the figure which illustrates a sectional elevation of the hydraulic speed governor applied to the end of a rotary member, such as the main shaft of a turbo blower or the like.

Referring more particularly to the drawing, A represents the casing of the machine intended to be driven such as a turbo blower, and B a bearing of the machine in which is journalled a main shaft C. The main shaft C in this instance has a reduced threaded end D on which is mounted a flange E having a recess F in which may be disposed a nut G whereby the flange E may be securely fastened to the end D of the shaft.

The flange E in the present instance has a cylindrical projection H at its forward face to extend into a recess J of a casing K for centralizing said casing with respect to the shaft C. The casing K may be secured to the flange E in any suitable manner, in the present instance bolts L are indicated for this purpose.

Preferably the casing K carries an integral projection or shaft O which is journalled in a cover plate P adjacent the casing K and is secured to the end of the frame A by means of bolts Q. The cover plate P may be provided with an integral extension R which supports at its outer end a plate S to act as a cover for the outer or free end of the shaft O.

The casing K is provided with a valve chamber X which extends transversely through the casing K and preferably through the axis of rotation of the shaft C. Plugs Y and Y' form closures for the ends of the valve chamber X.

Formed in the shaft O is an inlet passage 10 which communicates at one end with the valve chamber X and at its other end with a pipe 12 leading from a source (not shown) of oil under pressure. An annular groove 14 in the bore 16 of the extension R provides constant communication between the inlet passage 10 and the source of oil supply. A connecting passage 18 also formed in the shaft O leads from the valve chamber X to an annular groove 20 formed in the bore 16. Ports 22 and 24 leading from the passages 10 and 18 respectively communicate with grooves 14 and 20 respectively. A pipe 26 leads from the groove 20.

Disposed within the valve chamber X is a valve 28 of the plug type having an external groove 30 of such proportions as to afford communication between the inlet passage 10 and the connecting passage 18. A centrally disposed longitudinal bore 32 is formed throughout the length of the valve. The groove 30 communicates with the bore 32 by way of ports 34. A plug 36 provided with a stop shoulder 38 fits slidably in the bore 32. Oil which leaks past the plug 36 into the chamber X is exhausted by way of passages 40, 42 and 44 to prevent pressure against the lower face of the valve 28.

Oil which enters the bore 32 through the transverse passage 34 acts against the face 46 and tends to prevent movement of the valve in that direction. The valve 28 is offset with respect to the axis of rotation of the shaft C so that its center of gravity will lie to one side of the longitudinal axis of shaft C. This position will at all times be assured since the shoulder 38 of the plug 36 serves to limit movement of the valve in a direction in which the center of gravity of the valve might otherwise move into coincidence with the longitudinal axis of the shaft.

A practical use of the device is shown in the drawing. Oil from the passage 18 passes through a pipe 26 to a piston chamber 48 of a relay valve 50. The relay valve comprises a cylinder 52 and a piston 54 disposed therein. Oil from the pipe 26 may only enter the cylinder 50 beneath the piston 54. The piston 54 is normally held in a retracted position by a spring 58 seated on the piston at one end and with its other end on a spring seat 60, which bears against the end of an adjusting screw 62, said adjusting screw having a hand wheel 64 whereby the tension of the spring 58 may be varied.

Connected to the piston 54 is a rod 65 which extends slidably through the spring seat 60 and the adjusting screw 62 and is pivotally connected at its outer or free end to a floating lever 66. The opposite end of the floating lever may be pivotally connected to a rod 68 connected to a steam admission valve 70 in a valve casing 72 through which motive fluid may flow from a source of supply to a prime mover (not shown), but which may be a steam engine whereby the turbo blower is actuated. The base 74 of a bracket 76 forms a cover for the top of the valve casing 72 and supports at its top a cylinder 78 in which is disposed a spring pressed piston 80 threaded in this instance to the end of the rod 68.

Suitable means are provided for controlling the admission of power, such as oil under pressure, to the ends of the cylinder 78 for actuating the piston 80 and consequently the valve 70. To this end a chamber 90 is formed in a valve chest 92 preferably adjacent the cylinder 78 to receive slidably a pilot valve 94 having end heads 96 and 98 and an intermediate flange or head 100. The head 96 in this instance controls a passage 102 leading to the upper end of the cylinder 78 and the intermediate flange 100 controls a passage 104 leading to the lower end of the cylinder 78. The head 98 acts merely as a guide for the valve and also forms a closure for one end of the valve chamber 90. Oil for actuating the pilot valve is admitted into a chamber 106 in the valve chest 92 through a passage 108 and from thence passes into the valve chamber 90 through ports 110 formed in a valve bushing 112 inserted in the valve chest 92.

The operation of the device is as follows: Let it be assumed that the shaft C and the casing K are being rotated and oil is being forced through the pipe 12 from a source of supply (not shown). Since the inlet passage 18 is in constant communication with the pipe 12 oil will also flow through the inlet passage 10 and through the groove 30 and the passages 34 and 32 to the internal face of the plug Y' forming a column in the passage 32 to act against the face 46 of the valve 28. Owing to the fact that the center of gravity of the valve 28 lies to one side of the axis of rotation of the shaft C, the valve will be centrifugally forced toward the plug Y' thus tending to increase the area of communication between the groove 30 and the inlet passage 10 to wider limits. The oil however, in passing from the inlet passage 10 into the groove 30 is always compelled to pass through a restricted opening even when the valve moves toward the plug Y' and the pressure of the oil in the passages 34 and 32 as well as that in the connecting passage 18 will therefore be of considerably lower value than the pressure of oil in the inlet passage 10. The oil in the passage 18 and the pipe 47 and under the lower pressure will then act against the piston 54 tending to raise the piston against the pressure exerted thereon by the spring 58.

During the time that the prime mover is operating at the normal rate of speed, the pressure in the connecting passage 18 and therefore beneath the piston 54 will not have the effect of raising the piston 54 and therefore disturbing the position of the admission valve 70. When, however, due to various causes, the speed of the main shaft C increases, the increased speed of the shaft will cause the valve 28 to be thrown in an outward direction toward the plug Y' thus increasing the area of communication between the inlet passage 10 and the groove 30. The oil in the passage 10 is then able to flow more freely through the groove 30 and so an increase in pressure will occur in the area of lower pressure existing in the passage 18. Oil under higher pressure will then flow through the pipe 26 beneath the piston 54 and raise the piston in the cylinder 50. This movement of the piston will raise the pilot valve 94, so that oil may flow from the chamber 106 through ports 110 into the valve chamber 90 and thence through the passage 102 into the cylinder 78 to act on the upper surface of the piston 80 for depressing the admission valve 70 and thus reducing the flow of steam to the prime mover. This of course will have the effect of reducing the speed of the shaft C and as a consequence the centrifugal force acting on the valve 28 will decrease and the valve will again move in the direction of the plug Y restricting the opening between the groove 30 and the inlet passage 10 thus reducing the amount of oil flowing through said opening.

When the speed of the shaft C has been reduced to such an extent that the centrifugal force moving the valve 28 toward the plug Y' lessens and the valve 28 moves toward the chamber X, the port 44 permits of the discharge of oil from chamber X through passages 40 and 42 and from passage 32 through passages 34. The passage 10 is now covered by the valve 28 and the pressure of oil in passage 10 cannot act upon the oil in passage 18. Oil will then flow back through the pipe 26, passages 18 and 44 into the casing A. As the piston 54 moves downward it will move the pilot valve 94 downward so that oil may flow from the chamber 106 into the valve chamber 90 between the heads 96 and 100 and thence through the passage 104 beneath the piston 80 to raise the piston and the admission valve 70 to again admit a greater amount of steam to the prime mover.

The effect of the movable plunger 36 is to relieve the valve 28 of all hydraulic pressure except that of the oil acting on face 46. This device permits the use of oil under high pressure without eliminating the effect of the centrifugal force as would be the case if the valve 28 was sealed at its lower end and high pressure oil permitted to act over its entire cross-sectional area.

I claim:

1. A hydraulic speed governor, comprising a casing adapted to be attached to a rotary member and having a valve chamber therein, a projection on the casing having an inlet and a connecting passage extending into the valve chamber, a hydraulically operated valve in the valve chamber having a groove in its outer periphery extending across the inlet and connecting passages, a longitudinal bore in the valve, said bore being closed at one end by a sliding plunger, said valve adapted to be centrifugally moved by the rotation of the rotary member to change the relationship between the groove and the passages.

2. A hydraulic speed governor, comprising a casing adapted to be attached to a rotary member and having a valve chamber therein, a projection on the casing having an inlet and a connecting passage extending into the valve chamber, a hydraulically operated valve in the valve chamber having a groove in its outer periphery extending across the inlet and connecting passages, a longitudinal bore in the valve, said bore being closed at one end by a sliding plunger, said valve adapted to be centrifugally moved by the rotation of the rotary member to change the relationship between the groove and the passages, and means on the sliding plunger to limit the movement of the valve.

3. A hydraulic speed governor, comprising a casing adapted to a rotary member and having a valve chamber therein, a projection on the casing having an inlet and a connecting passage extending into the valve chamber, a hydraulically operated valve in the valve chamber having a groove in its outer periphery extending across the inlet and connecting passages, a longitudinal bore in the valve, said bore being closed at one end by a sliding plunger, said valve adapted to be centrifugally moved by the rotation of the rotary member to change the relationship between the groove and the passages, and a shoulder on the sliding plunger to limit the movement of the valve.

4. A hydraulic speed governor, comprising a casing adapted to be attached to a rotary member and having a valve chamber extending through the axis of rotation of the casing, said casing having an exhaust port leading from the valve chamber to the exterior of the casing, an inlet passage and a connecting passage in the casing opening into the valve chamber, and a valve in the chamber having an external groove and being offset with respect to the axis of rotation of the casing to enable said valve to be centrifugally actuated for controlling communication by said groove between the inlet and connecting passages and between the connecting passage and the exhaust port to maintain a pressure in the connecting passage and means slidable in a bore in the valve to limit the surface of the valve exposed to hydraulic pressure.

5. A hydraulic speed governor, comprising a casing adapted to be attached to a rotary member and having a valve chamber extending through the axis of rotation of the casing, said casing having an exhaust port leading from the valve chamber to the exterior of the casing, an inlet passage and a connecting passage in the casing opening into the valve chamber, and a valve in the chamber having an external groove and being offset with respect to the axis of rotation of the casing to enable said valve to be centrifugally actuated for controlling communication by said groove between the inlet and connecting passages and between the connecting passage and the exhaust port to maintain a pressure in the connecting passage, and means slidable in a bore in the valve comprising a plunger adapted to limit the surface of the valve exposed to hydraulic pressure and a shoulder on the plunger to limit the movement of the valve.

In testimony whereof I have signed this specification.

LESLIE R. HUFF.